Oct. 9, 1934.                C. J. HUGHEY                 1,976,346
             CONTROL FOR A PHOTOGRAPHIC RECORDING APPARATUS
                    Filed Jan. 20, 1934      2 Sheets-Sheet 1
Fig. 3.
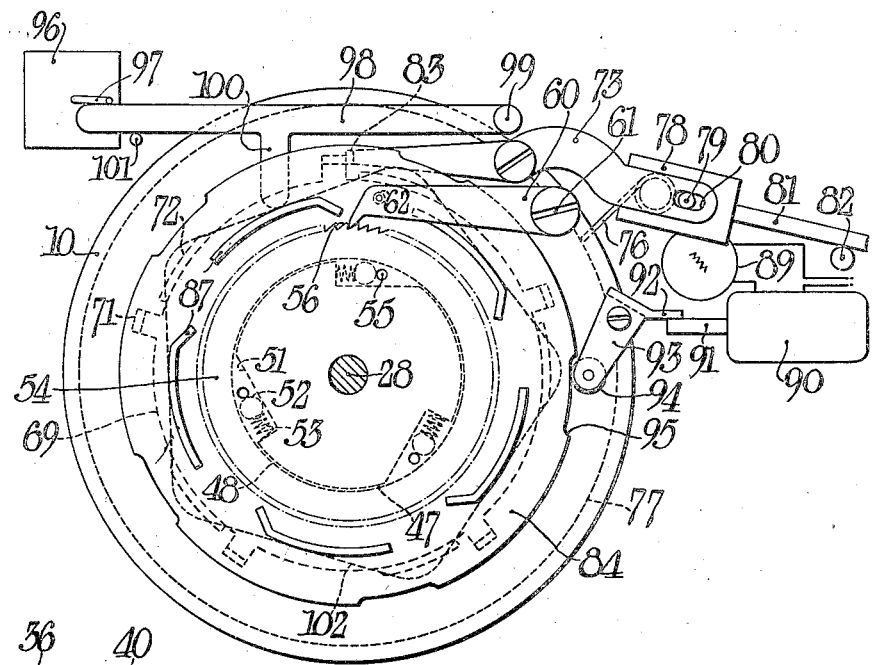
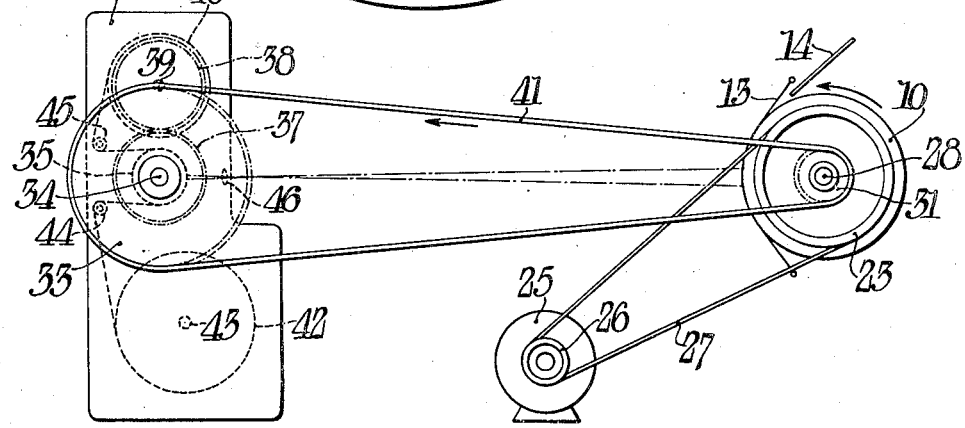
Fig. 1.
Inventor:
Carter J. Hughey, Patented Oct. 9, 1934

1,976,346

UNITED STATES PATENT OFFICE 1,976,346

CONTROL FOR A PHOTOGRAPHIC RECORDING APPARATUS

Carter J. Hughey, Rochester, N. Y., assignor to Eastman Kodak Company, Rochester, N. Y., a corporation of New York Application January 20, 1934, Serial No. 707,587

20 Claims. (Cl. 88—24)

The present invention relates to a control for a photographic recording apparatus and more particularly to a control in which a single document controlled member initiates a predetermined operating cycle for connection of the camera drive. It also initiates a predetermined operating cycle for disconnection of the camera drive.

The prior art is quite familiar with control arrangements for machines of this character in which the camera mechanism is not operated until a document is introduced into the photographic field of the machine. In that type of control some provision must be made for disconnecting the camera drive after the document has left the protographic field and in each case of the prior art a second document controlled member must be provided for actuation upon passage of the rear edge of the document.

The primary object of the present invention is the provision of a control for a photographic recording apparatus which consists of a single member for contact with the front and rear edges of the document and for starting predetermined operating cycles which accomplish engagement and disengagement between the camera drive and the driving means for the document.

Another object of the present invention is the provision of a control for a recording apparatus in which the document controlled member is spaced from the photographic field but in which the engagement of the camera drive is delayed for a predetermined operating cycle or until the front edge of the document has entered the photographic field. Conversely, the document controlled member operates to disengage the camera drive at a predetermined time after passage of the rear edge of the document so that the camera is not driven after the document has left the photographic field.

A further object of the present invention is the provision in a control for a recording apparatus comprising a power clutch and a control clutch, the engagement of the power clutch being accomplished through operation of the control clutch and both clutches being driven from the feeding drum of a feeding means.

Still another object of the present invention is the provision of a control clutch in a photographic recording apparatus, which clutch is under the supervision of a control member which cooperates with a document controlled member and which clutch upon engagement actuates a driven member or control disk to supervise the engagement and disengagement of a power clutch.

A still further object of the present invention is the provision of a delayed action control arrangement for a photographic recording apparatus in combination with a counter mechanism which is operated by a cam member of the control arrangement so that the number of documents passing through the apparatus may be noted.

Other objects of the invention will be suggested to those skilled in the art by the following disclosure.

The above and other objects of the invention are embodied in a control for a photographic recording apparatus having a photographic field and an exposure position in combination with a control clutch which is engaged upon entrance of a document into the photographic field to execute a predetermined rotation and then cause engagement of a power clutch which causes operation of the camera drive. The delayed action or elapsed time for a predetermined rotation in the control provides an opportunity for the front edge of the document to move through the feeding means and into the photographic field. The disengagement of the power clutch is also accomplished after a predetermined operating cycle to provide an opportunity for the rear edge of the document to leave the photographic field. Both predetermined operating cycles are initiated by the same document controlled member so that the additional controlled member which is operated by the rear edge of the document and which has always been considered necessary in the prior art may now be eliminated.

Reference is hereby made to the accompanying drawings in which similar reference characters designate similar elements and in which:

Fig. 1 is a side elevation of a document recording apparatus.

Fig. 3 is an end elevation of the control arrangement.

Figure 2:
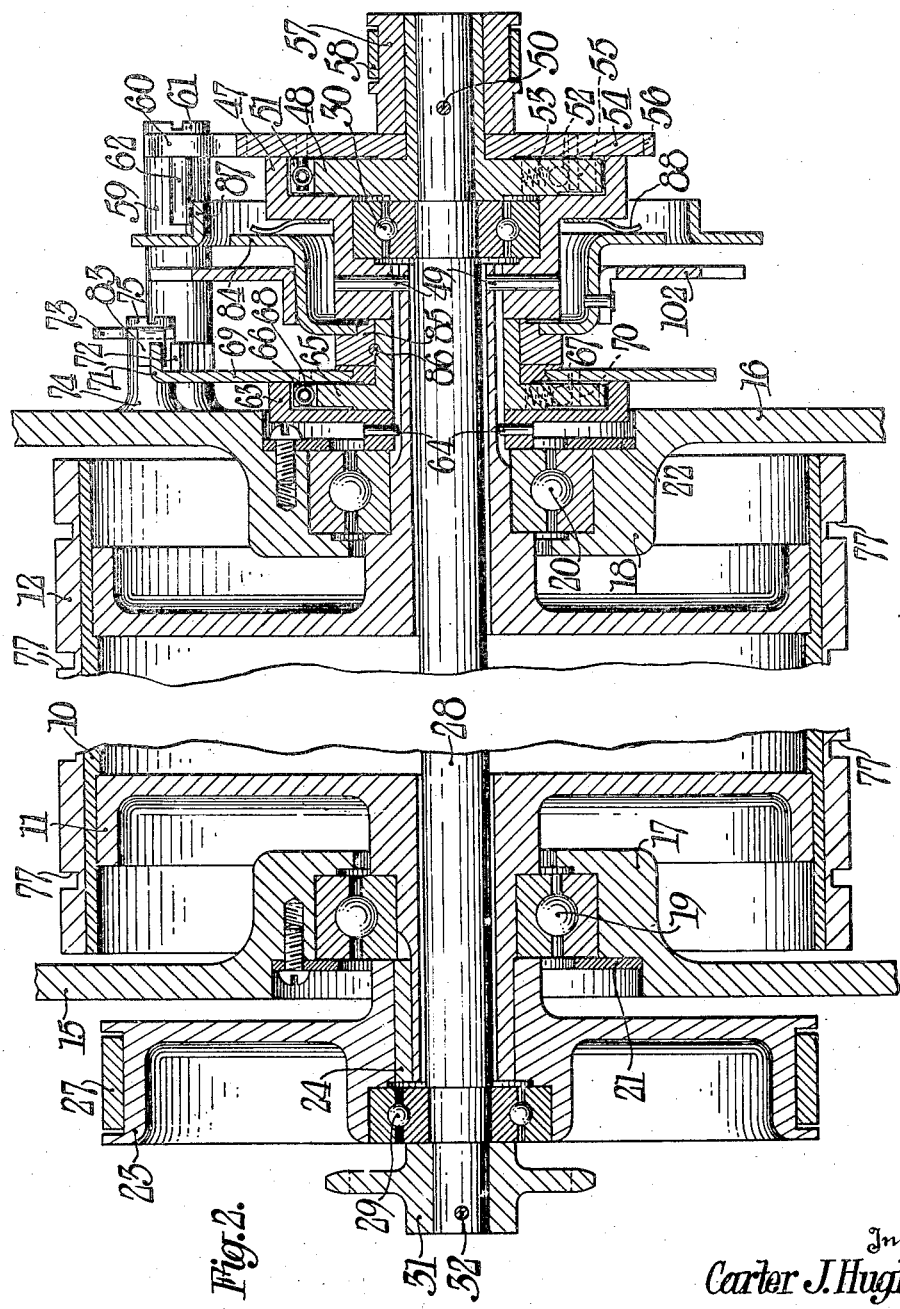
Fig. 2 is a vertical cross section through the feeding drum and the control arrangement.

Similarly to other document recording apparatus, the apparatus disclosed includes a photographic field and an exposure position, a feeding means for moving documents through the photographic field, and an advancing means for moving light-sensitive material through an exposure position.

The feeding means which is preferred is similar to that disclosed in the co-pending application of Hopkins and Hughey, Serial No. 478,838, filed August 30, 1930, for a Photographic recording apparatus. Such a feeding means may include a feeding drum 10 which is supported on a spider 11 and which is provided with an outer layer 12 of material having a high friction coefficient, such as cork. A plurality of wires 13 under suitable tension extend part way around the periphery of the feeding drum 10 and hold the documents, such as the sheet 14, against the outer layer 12 of the feeding drum 10.

The feeding drum 10 is rotatably mounted between the side frames 15 and 16 of the machine. Bushings 17 and 18 are formed in the respective side frames 15 and 16 and contain ball-bearings 19 and 20 which also make contact with the spider 11 for anti-frictional support of the feeding drum 10. Guard plates 21 and 22 are bolted over the respective ball-bearings 19 and 20.

A pulley 23 is mounted on the spider 11 and is connected to rotate therewith by means of a key 24. A motor 25, or other suitable prime mover, has a pulley 26. The motor 25 is arranged continuously to drive the feeding drum 10 by any suitable connection, such as an endless belt 27 which encircles the pulleys 23 and 26.

The advancing means for moving light-sensitive material continuously through an exposure position may be composed of a shaft 28 which extends through the center of spider 11 and which is mounted adjacent opposite ends in ball-bearings 29 and 30. A sprocket 31 is fastened to one end of shaft 28 by means of a pin 32. A large sprocket 33 is mounted upon a shaft 34 which may be connected in any suitable manner to rotate the roller 35 within the camera 36. A gear 37 may be mounted on shaft 34 and meshes with a gear 38 which is mounted on a shaft 39 which is connected in any suitable manner to the take-up roll 40 within the camera 36. The sprocket 31 is connected to drive the large sprocket 33 by any suitable means, such as an endless chain 41 which encircles feed sprockets 31 and 33.

The camera 36 may be constructed in any well-known manner but is preferably built according to the disclosures of the aforementioned co-pending application of Hopkins and Hughey or my co-pending applications No. 661,511, filed March 18, 1933 for Duplex cameras and No. 666,319, filed April 15, 1933 for an Indicating system for rolls of strip material. Such a camera includes a supply roll 42 which is rotatably mounted upon a spindle 43 and includes a pair of guide rollers 44 and 45. The film path in such a camera is preferably as follows: From supply roll 42, around guide roller 44, around roller 35, around guide roller 45, and to the take-up roll 40. An objective 46 is mounted in the front wall of camera 36 and has optical characteristics corresponding to the distance between the photographic field on the surface of the feeding drum 10 and the exposure position on the surface of roller 35. The limiting rays through the objective and for the photographic field and exposure position are indicated by the dot-dash lines of Fig. 1.

The operation of the apparatus will be briefly related. The motor 25 drives the feeding drum 10 to rotate in the direction of the arrow of Fig. 1. The documents may be fed between the surface of the drum and the wires 13 and are moved through the photographic field by rotation of the feeding drum 10. At the same time the control arrangement, which will be more fully described hereinafter, accomplishes the connection between the feeding means and the advancing means so that sprocket 31, sprocket 33, roller 35, and take-up roll 40, are rotated. The gear ratio between sprockets 31 and 33 and gears 37 and 38 may be readily determined for any particular machine and the selection of these gear ratios constitutes no part of the present invention but comes within the knowledge of any ordinary designer. The disclosure thus far has been primarily for the purpose of describing the background or setting for the invention. Some of the elements mentioned cooperate with the control means, which constitutes the invention, in the manner now to be related.

A clutch means for establishing the driving connection between the feeding means and the advancing means may be composed of an overrunning clutch which includes a driving element 47 and a driven element 48. The driving element 47 is connected to the spider 11 of the feeding drum 10 by means of pins 49 so as to rotate with said feeding drum, while the driven element 48 is connected to the shaft 28 of the advancing means by means of a pin 50. The engagement between clutch elements 47 and 48 is accomplished in a well-recognized manner and briefly is effected by the provision, within notches 51 in the driven element 48, of ball-bearings 52, which ball-bearings are normally pressed by springs 53 against the surface of driving element 47.

A clutch supervising means or power clutch control member may be constituted of a circular plate 54 which is provided with a central opening and which may rotate on and with respect to the driven element 48. This clutch control member carries one or more parts for cooperating with the overrunning clutch, such parts being preferably composed of pins 55 which are mounted in circular plate 54 and which extend into the notches 51 of the driven element 48 for engagement with the ball-bearings 52. Although the driving clutch element 47 rotates with the spider 11 of the feeding drum, the power clutch will be disengaged if the supervising or control member for the clutch is held against rotation because the pins 55 will then hold the ball-bearings 52 away from the surface of the driving element 47 of the clutch. On the other hand, if the circular plate 54 is not held against rotation, the springs 53 may act to press the ball-bearings 52 against the driven element 47 so that the ball-bearings 52 will be wedged between the clutch elements 47 and 48 for simultaneous rotation. The outer periphery of circular plate 54 is provided with a plurality of teeth 56, as best seen from Fig. 3.

A sleeve 57 is attached to the driven element 48 of the power clutch and may function as a pulley to drive a belt 58 which in turn rotates a revolving mirror for an edge printer as disclosed in the co-pending application of Hopkins, No. 610,062, filed May 9, 1932.

A stop means is adapted to engage the toothed periphery of the power clutch control member and during such engagement to hold the power clutch in disengagement. Such a stop means is mounted upon a post 59 which extends from side frame 16 and includes a pawl 60 which may pivot around a bolt 61 threaded into post 59. A pin 62 is attached to and extends laterally from the pawl 60. The toothed end of pawl 60 is adapted normally to make engagement with the toothed periphery of circular plate 54 and prevent rotation of the power clutch control member, or, in other words, the power clutch is normally disengaged when the stop means is in engagement with the clutch control member.

A control clutch is composed of a driving element 63 which is connected by pins 64 to the spider 11 of feeding drum 10 and of a driven element 65 which is mounted for free rotation with respect to the spider 11 of the feeding drum 10. The engagement between the elements 63 and 65 of the control clutch may be accomplished in exactly the same manner as the engagement of the power clutch was accomplished, that is, notches 66 may be provided in the periphery of driven element 65 to contain ball-bearings 67 which may be pressed by springs 68 against the adjacent surface of driving element 63. The control clutch is also of the overrunning type which is normally in engagement. A control clutch control member is mounted adjacent the control clutch for supervising the engagement and disengagement of the same. Such a control clutch control member may be composed of a circular plate 69 which is mounted for rotation with or with respect to the driven element 65 of the control clutch. A plurality of parts for disengaging the control clutch are mounted on circular plate 69 and may consist of a plurality of pins 70 which extend into the notches 66 of driven element 65 for moving ball-bearings 67 out of engagement with driving element 63 and against the action of springs 68.

The control clutch control member is also provided with a plurality of pairs of projections which may be angularly displaced or both radially and angularly displaced. These projections may be formed by a plurality of lugs 71 bent out of the material forming the circular plate 69 and also of lugs 72 which are bent out of the material of circular plate 69 but which are nearer the center of plate 69 or radially displaced as well as angularly displaced from the lugs 71.

A document controlled member is adapted to assume a normal position for blocking the control member of the control clutch but is movable by the passage of a document through the feeding means to a control position in which it makes abutment after predetermined rotation of said control member with the other projection thereon. Such a control member preferably includes an arm 73 which is intermediately pivoted to a post 74 extending from side frame 16 by means of a bolt 75. One end of arm 73 carries a finger 76 which extends into peripheral grooves 77 in the surface of the outer layer 12 on feeding drum 10 so that the arm 73 is rotated in a counter-clockwise direction, as viewed from Fig. 3, upon the movement of a document around the surface of feeding drum 10. A counterweight 78 has a pin 79 which engages a slot 80 in the end of arm 73 and has a rod 81 which rests upon a stud 82 so that the arm 73 and finger 76 are normally maintained in the position shown in Fig. 3. The other end of arm 73 has a lip 83 which is adapted alternatively to engage the lugs 71 and 72 on the control clutch control member.

Upon the entry of a document into the feeding means, the finger 76 is tripped and arm 73 is rotated so that lip 83 no longer abuts the adjacent lug 71, and the driven element 65 of the control clutch is permitted to rotate with the driving element 63 of that clutch and the feeding drum 10. This rotation takes place in a clockwise direction as viewed from Fig. 3 and continues until the lug 72 comes into abutment with the lip 83 of the arm 73. After the rear edge of the document has passed finger 76, then the counterweight 78 returns arm 73 to the position shown in Fig. 3 and again the elements 63 and 65 of the control clutch are engaged and the circular plate 69 of the control clutch control member rotates with the control clutch until the succeeding lug 71 comes into abutment with the lip 83 of the arm 73. Thus it is understood that the control clutch is engaged for a predetermined rotation after the entry of a document into the feeding means and also after the rear edge of the document has passed the finger 76 of the document controlled member.

The driven element 65 operates to rotate during engagement of the control clutch a driven member or a control disk 84. The control disk 84 is connected to the driven element 65 of the control clutch by means of a collar 85 which is fastened to the driven element 65 by means of a pin 86. The control disk 84 carries a plurality of portions 87 which are adapted to exert a camming action upon the pin 62 of the pawl 60. The relative angular position of the portions 87 and the lugs 71 is such that when the lip 83 of the arm 73 is in abutment with one of the lugs 71, then the pawl 60 is free to assume a position of engagement with the teeth 56 on the periphery of circular plate 54. The relative angular position of portions 87 and lugs 72 on circular plate 69 is such that when the lip 83 of arm 73 is in abutment with one of lugs 72, then the portion 87 has exerted a camming action on pin 62 to raise pawl 60 and permit engagement of the power clutch. When the document controlled member or arm 73 again returns to normal position, and after the control clutch control member has executed a predetermined rotation to bring the succeeding lug 71 into abutment with lip 83, then the portion 87 is not opposite pin 62 and the pawl 60 is again permitted to engage the toothed periphery of circular plate 54.

A friction connection is provided between the driving element 47 of the control clutch and the control disk 84 so that the lugs 71 and 72 on the control clutch control member are always held against the lip 83 of arm 73 in the abutting positions. Such a tendency drive may be provided by a plurality of leaf springs 88 mounted on one face of driving element 47 and bent frictionally to engage one face of the control disk 84.

The illumination of the photographic field is accomplished by the provision of a plurality of incandescent lamps 89 which are connected to a suitable source of power through a mercury switch 90. The mercury switch 90 has a rod 91 which is adapted to engage the lip 92 of a pivotally mounted cam follower 93. A roller 94 is rotatably mounted in the end of cam follower 93. The periphery of control disk 84 is provided with a plurality of dwells 95 which are so spaced around the periphery of control disk 84 that the lights are extinguished when the arm 73 is in abutment with one of the lugs 71. Upon operation of the document controlled member and rotation of the control clutch and control disk 84, the roller 94 and cam follower 93 are pivotally moved to permit closure of mercury switch 90 and energization of incandescent lamps 89.

It is sometimes quite desirable to count the number of documents passing through the recording apparatus, and this may be accomplished automatically by the following arrangement. A counter mechanism 96 of extremely well-known construction is mounted near the feeding hopper of the apparatus and has an operable member 97. As is well known, each actuation of the member 97 is registered on the counter mechanism 96. An arm 98 is pivotally mounted at 99 and has a projection 100 and is adapted to normally rest upon a pin 101. A pentagonal cam 102 is attached to the control disk 84 and is so located thereon that the projection 100 on arm 98 is raised by the points of cam 102 each time the control clutch control member moves from the position shown in Fig. 3 to a position in which the arm 73 abuts the lug 71 of the succeeding pair of lugs. In other words, each time that a document passes through the feeding means, the pentagonal cam 102 operates the member 97 of the counter mechanism 96 to record the passage of that document.

The operation of the control arrangement according to the present invention is as follows: The document is introduced into the feeding means between the wires 13 and the periphery of the feeding drum 10. The front edge of the document trips finger 76 and moves arm 73 so that lip 83 no longer abuts the lug 71. The springs 68 of the control clutch now permit engagement between the elements 63 and 65 of the control clutch and the control clutch control member or circular plate 69 executes a predetermined rotation. The control disk 84 also executes such a predetermined rotation and the portion 87 on control disk 84 raises pin 62 and pawl 60 out of engagement with the toothed periphery of the power clutch control member. This permits the engagement of elements 47 and 48 of the power clutch. Thus it will be noted that there is a predetermined delay between the tripping of finger 76 and the engagement of the power clutch to operate the camera drive. This interval is for the purpose of permitting the document to move into the photographic field and eliminates the necessity of locating finger 76 within the photographic field. The rotation of the control clutch control member continues until the other projection or lug 72 comes into abutment with the lip 83 on arm 73 whereupon the control clutch is disengaged, but the power clutch continues in engagement and continues to drive the advancing means for the light-sensitive strip material.

After the rear edge of the document passes finger 76, the document controlled member returns to normal position and the lip 83 moves out of abutment with the lug 72. This permits engagement of the control clutch and the consequent predetermined rotation of the control clutch control member and the control disk 84. As the predetermined rotation proceeds, the portion 87 permits the pawl 60 to drop into engagement with the toothed periphery of circular plate 54 to disengage the power clutch and the succeeding lug 71 comes into abutment with the lip 83 of arm 73 to accomplish the disengagement of the control clutch. Again the delayed action for disengagement of the clutches which is provided by the predetermined rotation is selected so that the rear edge of the document has an opportunity to pass through the photographic field before the camera drive is disconnected.

It will be evident that the use of the predetermined rotation of the various control members makes it possible completely to control the advancing means for the film by the use of a single document controlled member and permits the elimination of a document controlled member below the photographic field.

Since many other modifications of the present invention can readily be devised by those skilled in the art, the present disclosure is to be construed in an illustrative and not in a limiting sense. The scope of the invention is defined by the appended claims.

Having now particularly described my invention what I desire to secure by Letters Patent of the United States and what I claim is:

1. In an apparatus for photographically reproducing documents and having a photographic field and an exposure position, the combination with a feeding means for moving a document continuously through said photographic field, an advancing means for moving light sensitive material through said exposure position, and a clutch means between said feeding means and said advancing means, of a clutch supervising means movable to respective positions for the engagement and disengagement of said clutch means, a driven member for cooperating with said clutch supervising means, adapted after a predetermined operating cycle to move said clutch supervising means into position for engagement of said clutch means, and adapted after a successive predetermined operating cycle to move said clutch supervising means into position for disengagement of said clutch means, and a single document controlled means spaced from said photographic field, movable by the front edge of a document to a controlled position for initiating the first mentioned operating cycle, and movable to a normal position after passage of said document for initiating the second mentioned operating cycle.

2. In an apparatus for photographically reproducing documents and having a photographic field and an exposure position, the combination with a feeding means for moving a document continuously through said photographic field, an advancing means for moving light sensitive material through said exposure position, a document controlled member spaced from said photographic field and movable from a normal position to a controlled position by a document in the feeding means, and a clutch means between said feeding means and said advancing means, of a clutch supervising means movable to a position for engagement of said clutch means, and a driven member adapted, after a predetermined operating cycle to move said supervising means into position for engagement of said clutch means, said predetermined operating cycle being initiated by movement of said document controlled member to controlled position.

3. In an apparatus for photographically reproducing documents and having a photographic field and an exposure position, the combination with a feeding means for moving a document continuously through said photographic field, an advancing means for moving light sensitive material through said exposure position, a document controlled member spaced from said photographic field and movable from a normal position to a controlled position by a document in the feeding means, and a clutch means between said feeding means and said advancing means, of a clutch supervising means movable to a position for engagement of said clutch means, and a driven member, adapted after a predetermined operating cycle, to move said supervising means into position for engagement of said clutch means, said predetermined operating cycle being initiated by movement of said document controlled member to controlled position and corresponding in duration to the spacing of the document controlled member from the farther margin of the photographic field.

4. In an apparatus for photographically reproducing documents and having a photographic field and an exposure position, the combination with a feeding means for moving a document continuously through said photographic field, an advancing means for moving light sensitive material through said exposure position, a document controlled member spaced from said photographic field and movable from a controlled position to a normal position upon the passage thereby of the rear end of a document, and a clutch means between said feeding means and said advancing means, of a clutch supervising means movable to a position for disengagement of said clutch means and a driven member adapted after a predetermined operating cycle to move said supervising means into position for disengagement of said clutch means, said predetermined operating cycle being initiated by movement of said document controlled member to normal position.

5. In an apparatus for photographically reproducing documents and having a photographic field and an exposure position, the combination with a feeding means for moving a document continuously through said photographic field, an advancing means for moving light sensitive material through said exposure position, a document controlled member spaced from said photographic field and movable from a controlled position to a normal position upon the passage thereby of the rear end of a document, and a clutch means between said feeding means and said advancing means, of a clutch supervising means movable to a position for disengagement of said clutch means, and a driven member adapted after a predetermined operating cycle to move said supervising means into position for disengagement of said clutch means, said predetermined operating cycle being initiated by movement of said document controlled member to normal position and corresponding induration to the spacing of the document controlled member from the nearer margin of the photographic field.

6. In an apparatus for photographically reproducing documents and having a photographic field and an exposure position, the combination with a feeding means for moving a document continuously through said photographic field, an advancing means for moving light sensitive material through said exposure position and a clutch means between said feeding means and said advancing means, of a clutch control means movable to a position for the engagement of said clutch means, a driven member relatively rotatable with respect to said clutch control means and adapted after a predetermined relative rotation to move said clutch control means into position for engagement of said clutch means, a second clutch means between said driven member and said feeding means, a second clutch control means adapted upon release to permit engagement of said second clutch means, and a document controlled member movable by the front edge of a document to release the second clutch control means for engagement of the second clutch means and initiation of the relative rotation between said driven member and the first mentioned clutch control means.

7. In an apparatus for photographically reproducing documents and having a photographic field and an exposure position, the combination with a feeding means for moving a document continuously through said photographic field, an advancing means for moving light sensitive material through said exposure position, and a clutch means between said feeding means and said advancing means, of a clutch control means movable to a position for the engagement of said clutch means, a driven member relatively rotatable with respect to said clutch control means and adapted after a predetermined relative rotation to move said clutch control means into position for engagement of said clutch means, a second clutch means between said driven member and said feeding means, a second clutch control means adapted upon release to rotate with and permit engagement with said second clutch means but adapted upon being blocked to disengage said second clutch means, and a document controlled member movable by the front edge of a document to release the second clutch control means for rotation of said driven member but adapted after a predetermined rotation of the second clutch control means to block the same and cause disengagement of said second clutch means.

8. In an apparatus for photographically reproducing documents and adapted to receive a camera having a photographic field and an exposure position, the combination with a feeding means for moving a document continuously through said photographic field, an advancing means for moving light sensitive material through said exposure position, and a clutch means between said feeding means and said advancing means, of a clutch control means movable to a position for disengagement of said clutch means, a driven member relatively rotatable with respect to said clutch control means and adapted after a predetermined relative rotation to move said clutch control means into position for disengagement of said clutch means, a second clutch means between said driven member and said clutch means, a second clutch control means adapted upon release to permit engagement of said second clutch means, and a document controlled member movable after passage of the rear edge of a document to a normal position to release the second clutch control means for engagement of the second clutch means and accomplishment of the relative rotation between said driven member and the first mentioned clutch control means.

9. In an apparatus for photographically reproducing documents and adapted to receive a camera having a photographic field and an exposure position, the combination with a feeding means for moving a document continuously through said photographic field, an advancing means for moving light sensitive material through said exposure position, and a clutch means between said feeding means and said advancing means, of a clutch control means movable to a position for disengagement of said clutch control means, a driven member relatively rotatable with respect to said clutch control means and adapted after a predetermined relative rotation to move said clutch control means into position for disengagement of said clutch means, a second clutch means between said driven member and said clutch means, a second clutch control means adapted upon release to rotate with and permit engagement with said second clutch means but adapted upon being blocked to disengage said second clutch means, and a document controlled member movable after passage of the rear edge of a document to a normal position to release the second clutch control means for rotation of said driven member but adapted after a predetermined rotation of the second clutch control means to block the same and cause disengagement of both of said clutch means.

10. In a document controlled photographic recording apparatus, the combination with a feeding means for moving documents and including a drum which is continuously rotated, a control clutch including a driven element and a driving element which is connected to said drum, and a power clutch including a driven element and a driving element which is connected to said drum, of two clutch control members each rotatably mounted on the driven elements of respective clutches and each having a part for disengaging the adjacent clutch, a stop means for engaging the clutch control member associated with said power clutch, and a control disk connected to the driven element of the control clutch and having a portion for moving said stop means out of engagement with the power clutch control member.

11. In a document controlled photographic recording apparatus, the combination with a feeding means for moving documents and including a drum which is continuously rotated, a control clutch including a driven element and a driving element which is connected to said drum, and a power clutch including a driven element and a driving element which is also connected to said drum, of two clutch control members each cooperating with the driven elements of respective clutches and each having a part for disengaging the adjacent clutch, a stop means adapted to engage the power clutch control member and to cause disengagement of said power clutch, and a control disk connected to the driven element of the control clutch and having a portion for moving said stop means out of engagement with the power clutch control member to permit engagement of said power clutch.

12. In a document controlled photographic recording apparatus, the combination with a feeding means for moving documents and including a drum which is continuously rotated, a control clutch including a driven element and a driving element which is connected to said drum, and a power clutch including a driven element and a driving element which is also connected to said drum, of two clutch control members each cooperating with the driven elements of respective clutches and each having a part for disengaging the adjacent clutch, a stop means adapted to engage the power clutch control member and to cause disengagement of said power clutch, a control disk connected to the driven element of the control clutch and having a portion for moving said stop means out of engagement with the power clutch control member to permit engagement of said power clutch, and a friction element between the driven element of the power clutch and the control disk to form a tendency drive therefor and to hold the driven element of the control clutch against the part on the respective clutch control member.

13. In a document controlled connection for a photographic recording apparatus, the combination with a feeding drum which is continuously rotated, a drive shaft adapted to be connected to a photographic camera, a normally engaged clutch between said drum and said drive shaft, a clutch control means adapted upon being held against rotation to disengage said clutch means and a stop means adapted normally to engage said clutch control means and to prevent rotation thereof, of a control disk having a portion for moving said stop means into engagement with said clutch control means, a second normally engaged clutch having one element connected to said feeding drum and the other element connected to said control disk, a second clutch control means having a pair of projections thereon adapted upon being held against rotation to engage said second clutch means, and a document controlled member normally adapted to abut one of said projections and prevent said second clutch control means from rotating and adapted to be moved by a document in said feeding means into a controlled position, to permit a predetermined rotation of said second clutch control means and then to abut the other projection and prevent said second clutch control means from rotating.

14. In a document controlled photographic recording apparatus, the combination with a feeding means for moving documents and including a drum which is rotated continuously, a counter mechanism including an operable member for moving the counter mechanism, a control clutch including a driven element and a driving element which is connected to said drum, and a control member cooperating with one element of said clutch, having a part for disengaging said clutch, and including a pair of angularly displaced projections, a document controlled member normally in abutment with one of said projections to disengage said clutch and adapted upon movement to a controlled position by a document in said feeding means to permit engagement of said clutch and a predetermined rotation of the control member until the other projection abuts the document controlled member, and a control disk connected to the driven element of said clutch and including a cam moving therewith and for actuating the operable member of the counter mechanism for each document entering the feeding means.

15. In a document controlled photographic recording apparatus, the combination with a feeding means for moving documents and including a drum which is continuously rotated, a clutch including a driving element which is connected to said drum and including a driven element, of a control member having a part for disengaging said clutch and having a pair of projections which are angularly displaced, and a document controlled member adapted in normal position to abut one of said projections and hold said clutch disengaged, and adapted upon movement to a controlled position by a document in the feeding means to execute a predetermined rotation with the driven element of said clutch and then to abut the other projection on said control member for disengagement of said clutch.

16. In a document controlled photographic recording apparatus, the combination with a feeding means for moving documents and including a drum which is continuously rotated, a clutch including a driving element which is connected to said drum and including a driven element, of a control member having a part for disengaging said clutch and having a plurality of pairs of projections which are angularly displaced, and a document controlled member adapted upon movement to a controlled position by a document in the feeding means to abut one projection of a pair on said control member and hold said clutch disengaged, adapted after passage of the document to permit a predetermined rotation of the control member with the driven element of said clutch and then to abut one projection of the next pair for disengagement of said clutch.

17. In a document controlled photographic recording apparatus, the combination with a feeding means for moving documents and including a drum which is continuously rotated, a clutch including a driving element which is connected to said drum and including a driven element, of a control member which is mounted for rotation with and upon the driven element of said clutch, having a part for disengaging said clutch and having a pair of projections which are angularly displaced, and a document controlled member adapted in normal position to abut one of said projections and hold said clutch disengaged, and adapted upon movement to a controlled position by a document in the feeding means to execute a predetermined rotation with the driven element of said clutch and then to abut the other projection on said control member for disengagement of said clutch.

18. In a document controlled photographic recording apparatus, the combination with a feeding means for moving documents and including a drum which is continuously rotated, a clutch including a driving element which is connected to said drum and including a driven element, of a control member which is mounted for rotation on and with respect to the driven element of said clutch means, having a part for disengaging said clutch and having a pair of projections which are angularly and radially displaced, and a document controlled member adapted in normal position to abut one of said projections and hold said clutch disengaged, and adapted upon movement to a controlled position by a document in the feeding means to execute a predetermined rotation with the driven element of said clutch and then to abut the other projection on said control member for disengagement of said clutch.

19. In a document controlled photographic recording apparatus, the combination with a feeding means for moving documents and including a drum which is rotated continuously, a control clutch including a driving element which is connected to said drum and including a driven element, a power clutch including a driving element which is also connected to said drum and including a driven element, and a power clutch control member carrying a part for disengaging said power clutch, a stop means for engaging said power clutch control member to disengage said power clutch, and a control clutch control member carrying a part for disengaging said control clutch and having a pair of angularly displaced projections, of a document controlled member adapted alternatively to abut the projection on said control clutch control member, and a control disk connected to the driven element of said control clutch and including a portion for moving said stop means out of engagement with said power clutch control member.

20. In a document controlled photographic recording apparatus, the combination with a feeding means for moving documents and including a drum which is rotated continuously, a control clutch including a driving element which is connected to said drum and including a driven element, a power clutch including a driving element which is also connected to said drum and including a driven element, a power clutch control member carrying a part for disengaging said power clutch, a stop means for engaging said power clutch control member to disengage said power clutch, and a control clutch control member carrying a part for disengaging said control clutch and having a pair of angularly displaced projections, of a document controlled member adapted alternatively to abut the projections on said control clutch control member, and a control disk connected to the driven element of said control clutch and including a portion for moving said stop means out of engagement with said power clutch control member, said portion being arranged to permit engagement of said stop means during abutment of the document controlled member with one of said projections and to disengage said stop means during the alternate abutment of the document controlled member with the other projection.

CARTER J. HUGHEY.